United States Patent Office 2,994,856
Patented Aug. 1, 1961

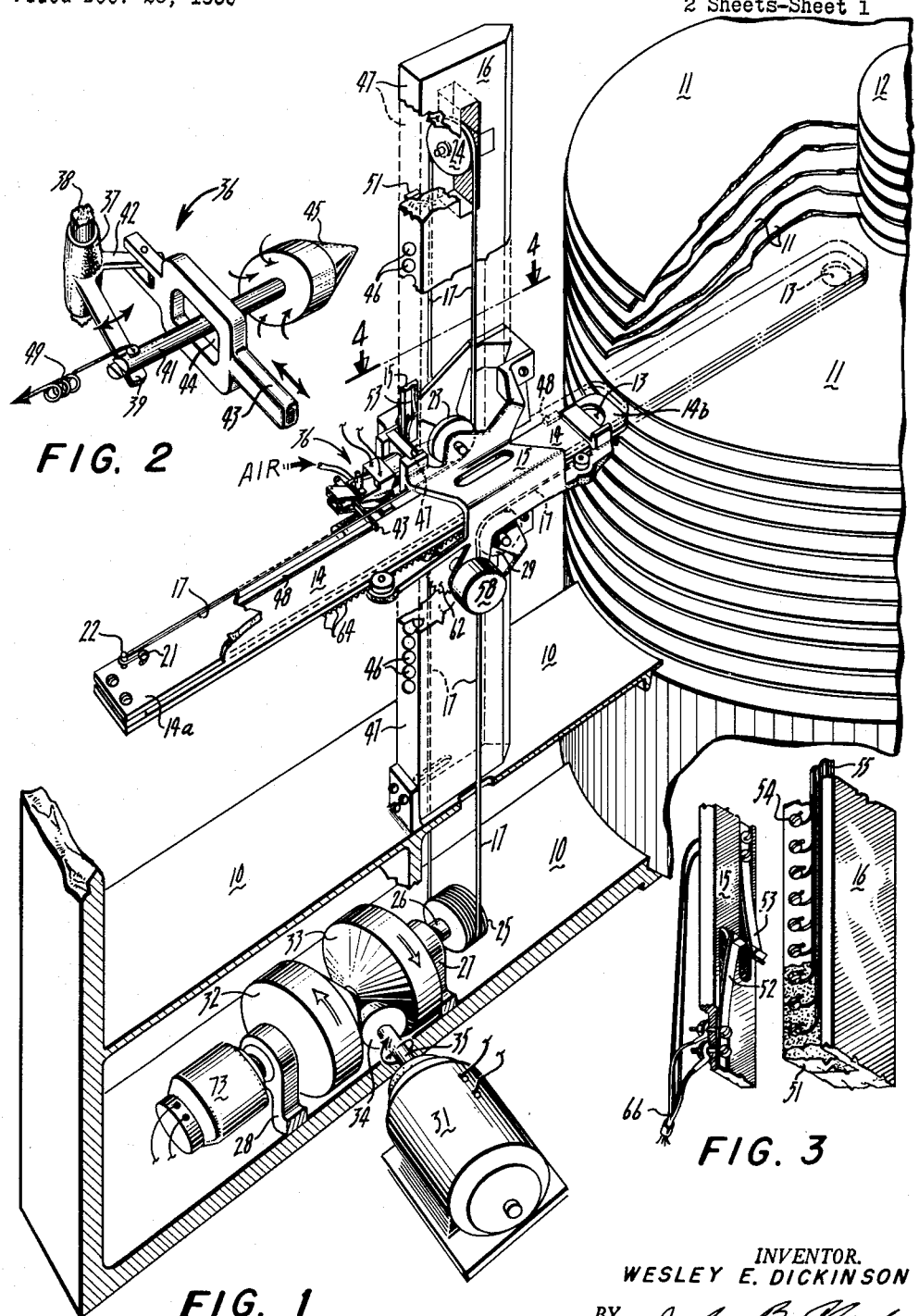

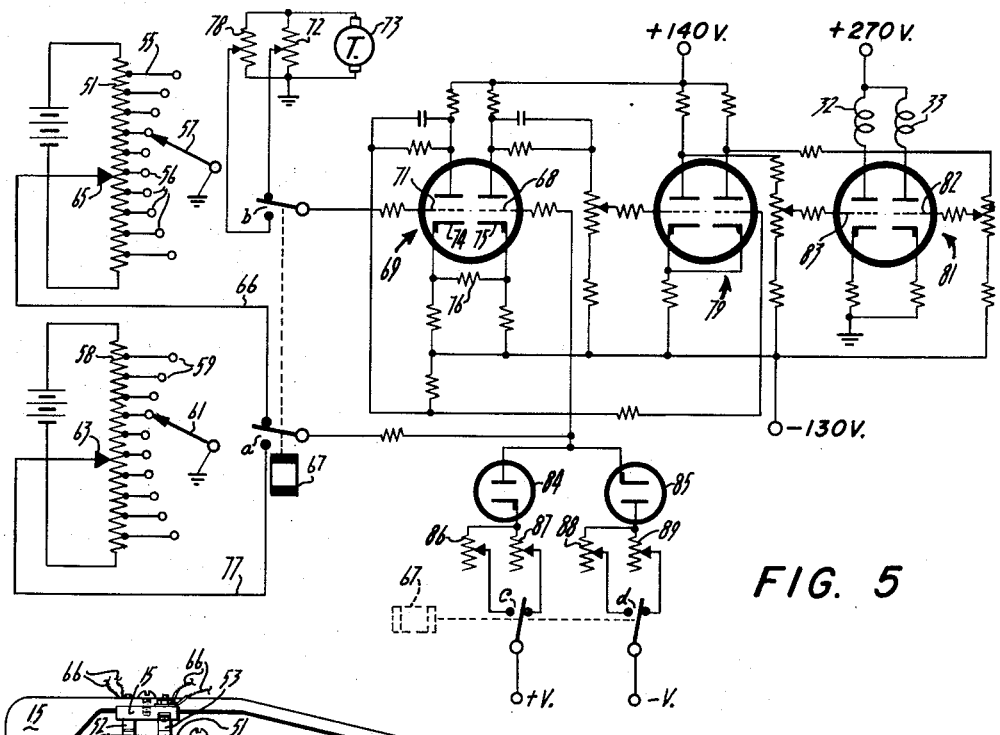
FIG. 5
FIG. 4
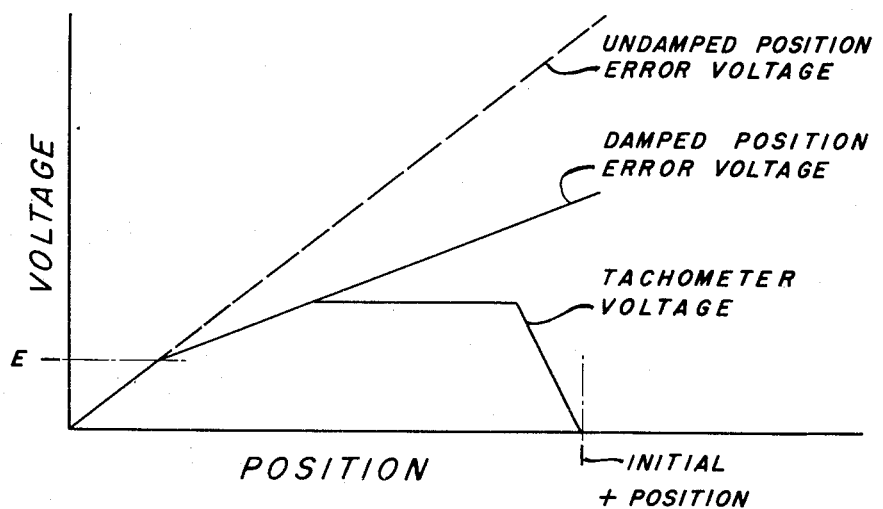
FIG. 6

2,994,856
POSITIONING MECHANISM
Wesley E. Dickinson, San Jose, Calif., assignor to International Business Machines Corporation, New York, N.Y., a corporation of New York
Filed Dec. 23, 1955, Ser. No. 555,006
11 Claims. (Cl. 340—174.1)

The present invention relates generally to magnetic recording devices and, more particularly, to such devices wherein means are provided for selectively positioning a magnetic transducer adjacent selected portions of a magnetic recording medium.

In machines of the type disclosed in the copending application Serial No. 477,468 filed Dec. 24, 1954, wherein a magnetic transducer is selectively positioned in each of two dimensions, i.e., adjacent a selected one of several members having a plurality of magnetic recording paths as well as adjacent a selected one of said paths, it is highly desirable to position the transducer in as short a time as possible to provide a minimum access time to information stored in the recording medium. To this end the mass of the moving parts is maintained at a minimum. However, mass is involved, and due to the inertia of the moving parts it is necessary to provide damping in anticipation of the destination to thereby enable the moving parts to arrive at the destination in a minimum amount of time, i.e., with a minimum amount of hunting.

The problem of providing damping for a mechanism of the type disclosed in the aforementioned application is complicated by several factors, due at least in part to non-linearities inherent in the system, such as: (1) different masses are involved in moving the transducer from one recording member to another and from one recording path on a given member to another, thereby requiring different degrees of damping in each case; (2) both long and short moves are required, and to maintain the access time at a minimum it is necessary to provide different degrees of damping in each case since a short move may require less damping than a long move; and (3) the various moving parts are moved in each of two directions and since it has been found that the damping adjustment necessary when moving a given mass a given distance in one direction may differ from the damping adjustment necessary when moving that mass the same distance in the opposite direction, means for controlling the degree of damping in accordance with the direction of travel are required.

It is an object of the present invention to provide an improved mechanism for positioning a magnetic transducer adjacent selected portions of a magnetic recording medium.

Another object is to provide a positioning device having a mechanism for selectively varying the damping thereof according to the mass being moved.

A further object is to provide a positioning device having a mechanism for selectively varying the damping thereof according to the length of a move.

Another object is to provide a device of the type described having structure for selectively varying the damping thereof according to the direction of travel.

A still further object is to provide a mechanism for positioning a magnetic transducer adjacent a selected recording track of a selected recording medium, having structure for damping the motion thereof according to the mass being moved and to the length and direction of movement.

Still another object is to provide a positioning device having independent means for controlling damping thereto in response to the length and direction of movement.

Other objects of the invention will be pointed out in the following description and claims and illustrated in the accompanying drawings, which disclose, by way of example, the principle of the invention and the best mode which has been contemplated of applying that principle.

In the drawings:
FIG. 1 is a partial perspective view of a magnetic transducer positioning device.
FIG. 2 is a perspective view of an interlock mechanism utilized in connection with the structure shown in FIG. 1.
FIG. 3 is an expanded, partial perspective view of the potentiometers and wipers of the positioning device shown in FIG. 1.
FIG. 4 is a partial sectional view taken along line 4—4 of FIG. 1.
FIG. 5 is a schematic diagram of an embodiment of the present invention.
FIG. 6 is a diagrammatic illustration of the operation of the present invention.

Referring now to FIG. 1, the positioning device there shown is supported by a frame 10 mounted adjacent an array of spaced magnetic recording discs 11 secured to a rotatable shaft 12 for rotation therewith. The positioning device is provided for disposing a magnetic transducer 13 carried by an arm 14 adjacent a selected recording track on one of the several discs 11. The arm 14 is slidably mounted for lateral movement within a carriage 15 which, in turn, is slidably mounted for movement along a vertically disposed way 16 suitably secured to and supported by the frame 10. The carriage 15 and arm 14 are driven vertically and laterally, respectively, as is necessary, by a cable 17 secured to the arm 14 near one end 14a thereof with a machine screw 21. The cable 17 extends from the machine screw 21 around a pin 22, thence around a pulley 23 mounted on the carriage 15, upwardly over a pulley 24 supported by the way 16, thence downwardly and about a pulley 25 secured to a shaft 26 journalled in bearings 27 and 28 secured to the frame 10, from where it is taken upwardly around a pulley 29 and is secured to the other end 14b of the arm 14.

The shaft 26 is driven by a motor 31 under the control of two electromagnetic clutches 32 and 33. The drive members of each of these clutches are secured to the shaft 26, the driven members thereof being arranged in driven engagement with a drive member 34 secured to the shaft 35 of the motor 31. Thus, if the arm 14 is fixed to resist movement relative to the carriage 15 and if it is clear of the discs 11, the carriage 15 is positioned along the way 16 under the control of the clutches 32 and 33. The motor 31 is constantly driven and the shaft 26 and pulley 25 mounted thereon are driven in one direction or the other, dependent upon the degree of energization of the clutches 32 and 33, thereby raising or lowering the carriage 15 under the control of the clutches. If the carriage 15 is locked to the way 16 and the arm 14 is free to move, the positioning of the arm is similarly under the control of the clutches 32 and 33.

To permit selective movement of the carriage 15 and arm 14, an interlock device 36 is provided. The linkage of the interlock is shown enlarged in FIG. 2 and comprises a bell crank 37 journalled on a shaft 38 secured to and supported by the carriage 15. One arm 39 of the bell crank 37 is pinned to a rod 41, the other arm 42 thereof being pinned to a link 43 provided with an opening 44 through which the rod 41 extends. The rod 41 carries a conically shaped member 45 arranged for insertion in a selected one of several apertures 46 (FIG. 1) provided in the face 47 of the way 16 for locking the carriage to the way. As will become clear, each such aperture 46 is located to dispose the carriage 15 in position adjacent a corresponding disc 11 when the member 45 engages therewith, and the carriage is thus locked to the way adjacent the disc corresponding to an aperture when the member 45 is inserted in that aperture.

The link 43 is moved transversely of the arm 14 when the bell crank 37 is moved in a clockwise direction and is arranged to slide in front of a stop 48 secured to the arm 14 if and when the arm is in its rearmost position, as is shown in full lines in the drawing. Under these conditions the member 45 is disengaged from the way, the arm 14 being clear of the discs at this time, thereby permitting the cable 17 to drive the carriage upwardly or downwardly under the control of the clutches 32 and 33, as described. (It should be noted that the stop 48 extends to the rear portion 14a of the arm and thereby prevents the member 45 from being withdrawn from an aperture 46 until the arm 14 is withdrawn to its rearmost position.) Thus, the carriage cannot be moved vertically unless the arm 14 is withdrawn, nor can the arm be moved laterally until the member 45 is properly seated in one of the apertures 46. The linkage 36 is biased by means of a spring 49 to urge the member 45 apart from the way 16 and to urge the link 43 to the position shown in FIG. 1. Means, such as air, are provided to seat the member 45 in a selected one of the apertures 46, at which time the link 43 is withdrawn, thereby permitting position of the arm 14. When the air pressure is released, the member 45 is withdrawn, providing the arm 14 is in its rearmost position, since if the arm is not in this position the link will strike the side of the stop and will prevent withdrawal of the member 45.

It will be recalled that the positioning device shown in FIG. 1 is arranged to position the transducer adjacent a selected track on a selected one of the several discs 11. To accomplish this, the clutches are selectively energized in a manner to be described to first position the carriage 15 adjacent the selected disc, the arm 14 being in its rearmost position at this time. When the carriage is in position, the member 45 is driven into the appropriate aperture 46 to lock the carriage to the way. At this time, the link 43 is withdrawn, thus freeing the arm, and the clutches 32 and 33 are again energized to drive the arm into position.

An elongated strip 51 of resistive material, such as conductive plastic, is disposed along the way 16 on the far side thereof as viewed in FIG. 1, and is operatively engaged with a pair of wipers 52 and 53 (FIG. 3) supported by the carriage 15 for movement therewith. A plurality of taps 54 along the strip 51 are connected via lines 55 to corresponding terminals 56 (FIG. 5) of a switch 57. Each of the taps on the strip 51 (FIG. 3) corresponds to one of the several discs 11 and, as will become clear, when one of these taps is grounded by means of the switch 57 (FIG. 5), the mechanism is controlled to position the carriage in such a way that the arm 14 (FIG. 1) is adjacent the disc defined by that tap. Similarly, a potentiometer 58 having a plurality of taps connected to terminals 59 (FIG. 5) of a switch 61 is provided to control the lateral positioning of the arm. When a selected tap is grounded via the switch 61, the arm 14 (FIG. 1) is arranged to position the transducer 13 according to the particular tap grounded, each such tap corresponding to a given track. The potentiometer 58 is driven by a pinion 62 which is supported on a shaft (not shown) connected to the shaft of the potentiometer 58 which drives the wiper 63 (FIG. 5) thereof. The pinion 62 (FIG. 1) is driven by a rack 64 secured to the arm 14, and it will be clear, therefore, that the position of the wiper 63 of the potentiometer 58 along the resistive path provided by the potentiometer 58 is the analog of the position of the transducer.

The positioning of the transducer 13 is, therefore, under the control of the switches 57 and 61 (FIG. 5), the switch 57 controlling the disc selection and the switch 61 controlling the track selection. The wipers 52 and 53 (FIG. 3) are represented in FIG. 5 by the single reference number 65 and are referred to hereinafter by the number 65. The wiper 65 is connected via a line 66 through the n/c a contacts of a relay 67 to a control grid 68 of a difference amplifier 69, a second control grid 71 of which is connected through the n/c b contacts of the relay 67 to the arm of a potentiometer 72 connected across the output of a tachometer 73 (FIG. 1) driven by the shaft 26. Thus, a voltage corresponding to the speed of rotation of the shaft 26 is developed by the tachometer 73 and is applied across the potentiometer 72, the polarity of this voltage being determined by the direction of rotation of the shaft 26. The cathodes 74 and 75 of the difference amplifier 69 are tied together through a suitable resistor 76 to provide cathode coupling for the operation of the difference amplifier. Thus, when one of the control grids 68 or 71 becomes slightly more positive than the other, the cathodes 74 and 75 both rise in potential, thereby effectively lowering the potential of the other control rid and magnifying the difference in potential.

The strip 51 is connected across a floating power supply, the potentiometer 58 being similarly connected across a floating power supply, and when one of the taps 54 associated with the strip 51 is grounded via the switch 57, the line 66 goes positive or negative by an amount corresponding to the position of the wiper 65 relative to the grounded tap. Similarly, a line 77 connected to the wiper 63 of the potentiometer 58 is positive or negative in an amount corresponding to the position of the wiper 63 relative to the tap 59 grounded by the switch 61. Since the line 77 is connected through the n/o a contacts of the relay 67 to the control grid 68, this potential is connected to the control grid when the relay 67 is energized. Additionally, a potentiometer 78 arranged in parallel with the potentiometer 72 across the tachometer 73 has a wiper which is connected through the n/o b contacts of the relay 67 to the control grid 71, and when the relay 67 is energized, therefore, the portion of the tachometer voltage determined by the position of the wiper of the potentiometer 78 is connected to the control grid 71.

The relay 67 is energized by means of a switch (not shown) which is closed when the member 45 (FIG. 2) is inserted in one of the apertures 46 (FIG. 1), it being deenergized when the member 45 is not in engagement with the way 16. Thus, when the member 45 is engaged within one of the apertures 46 on the way 16, the wiper 65 (FIG. 5) is connected to the control grid 68 of the difference amplifier 69, the wiper 63 being connected to the control grid 68 when the member 45 is withdrawn. Similarly, the wiper of the potentiometer 72 is connected to the control grid 71 when the member 45 is engaged within an aperture and the wiper of the potentiometer 78 is connected to the control grid 71 when the member 45 is in an inoperative position.

The plates of the difference amplifier 69 are connected to the corresponding control grids of a second difference amplifier 79, the plates of which are connected to corresponding control grids of a power amplifier 81. The windings of the clutches 32 and 33 are connected in series with the corresponding plates of the amplifier 81 and +270 volts, and it will be clear that the current passing through these windings is determined by the potential of the control grid of the amplifier 81 corresponding thereto. Assuming that the switch 57 is positioned according to the desired disc and that the link 43 (FIG. 1) is inserted in front of the stop 48, i.e., with the member 45 withdrawn and the relay 67 de-energized, a voltage referred to as the error signal and corresponding to the position of the wiper 65 relative to the desired disc is connected to the control grid 68, it being positive or negative according to the direction of movement necessary to position the arm 14 at this disc. Prior to the movement of the shaft 26 (FIG. 1) there is no voltage developed by the tachometer 73, thereby maintaining the control grid 71 (FIG. 5) at ground potential. If the error signal is negative with respect to ground, the control grid 71 is more positive than the control grid 68.

As explained earlier, any difference in potential between the control grids 68 and 71 is amplified, thereby permitting more current to flow through one or the other of the two clutches 32 or 33, and the net torque applied to the shaft 26 (FIG. 1) drives the pulley 25 to move the carriage 15 toward the selected disc. When the shaft 26 starts to rotate, the tachometer 73 generates a voltage across the potentiometer 72 (FIG. 5), the tapped portion of which is connected to the control grid 71. This voltage is arranged to oppose the error signal applied to the control grid 68 and provide the desired damping. The tachometer voltage applied to the control grid 71 increases until the shaft 26 reaches its maximum velocity, at which time it remains constant (see FIG. 6) until the tachometer voltage exceeds the error signal. This tends to reverse the direction of rotation of the shaft 26 but, due to inertia, the effect is merely to brake the shaft. Since the error signal decreases with motion and since the speed of rotation of the shaft 26 decreases when the tachometer voltage exceeds the error signal, the clutches 32 and 33 are operated to stop the carriage at the desired position, i.e., to stop the carriage when the error signal is zero. The tachometer 73 anticipates the destination determined by the position of the switch 57 so that the braking applied to the shaft 26 via the clutch 32 or 33 is such that the carriage comes to rest at the destination with a minimum of hunting. The tachometer voltage necessary to accomplish this action most efficiently is determined by the setting of the potentiometer 72 when the carriage 15 is being moved, and by the setting of the potentiometer 78 when the arm 14 is being moved. Thus, in this way independent adjustment according to the mass being moved is provided to damp the action of the positioning mechanism, it being understood that when the relay 67 is energized the arm 14 is positioned in a manner similar to that described in connection with the positioning of the carriage 15 by the controlled energization of the clutches 32 and 33.

It will be recalled that it is desirable to provide means for controlling the damping of the positioning mechanism according to the length and direction of travel of the carriage 15 and arm 14. For this purpose two diodes 84 and 85 (FIG. 5) are provided. The plate of the diode 84 and the cathode of the diode 85 are connected to the control grid 68, the cathode of the diode 84 being connected to one side of two potentiometers 86 and 87. The plate of the diode 85 is connected to one side of two potentiometers 88 and 89. The arm of the potentiometer 86 is connected to the n/o c contacts of the relay 67, the arm of the potentiometer 87 being connected through the n/c c points of the relay 67 to a plus voltage. Similarly, the arm of the potentiometer 88 is connected to the n/o d contacts of the relay 67, the arm of the potentiometer 89 being connected through the n/c d points of this relay to a minus voltage. When the error signal applied to the control grid 68 rises above the potential of the cathode of the diode 84 or drops below the potential of the plate of the diode 85, the diode 84 or 85, respectively, conducts and thereby decreases the magnitude of the error signal applied to the control grid 68 under the control of potentiometers 86 through 89. Thus, damping of the error signal is a function of the error signal, i.e., a function of the length of travel, there being no damping via this circuitry if the error signal is less than the voltage supplied to the c and d transfer points of the relay 67.

It should be noted that the independent adjustment of these potentiometers permits selective variation in the damping applied according to the mass being moved as well as to the length and direction of movement. The amount of damping provided by the tachometer voltage is determined by setting the potentiometer 72 at a position which permits the mass of the carriage to be positioned in the most efficient manner, the potentiometers 87 and 89 being arranged to determine the point at which additional damping is provided according to the length and direction of movement. Similarly, the potentiometer 78 is adjusted according to the mass of the arm, the potentiometers 86 and 88 being independently adjustable to determine the amount of additional damping applied according to the length and direction of movement. The described circuitry, therefore, provides means for damping the motion of the positioning mechanism according to the mass being moved as well as the length and direction of movement for each such mass. It is in this way that a minimum access time to a selected track determined by the settings of the switches 57 and 61 is obtained.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for selectively positioning a magnetic transducer, the combination of means for supporting the transducer for movement along each of two axes, means for operating said supporting means to position said transducer along each of said axes, and means for damping said operating means according to the mass being moved and the length and direction of movement.

2. In a device for selectively positioning a magnetic transducer, the combination of means for supporting the transducer for movement along each of two axes, means for operating said supporting means to position said transducer along each of said axes, means under control of said supporting means for differentially damping the said operating means, and means for independently adjusting the damping according to the axis along which the transducer is being positioned.

3. In a device for selectively positioning a magnetic transducer, the combination of means for supporting the transducer for movement along each of two axes, operating means for moving said supporting means to position said transducer along each of said axes, and damping means for damping the motion of said supporting means according to the mass being moved and the length and direction of movement, said damping means being independently adjustable according to the axis along which the transducer is being positioned.

4. In a device for positioning a magnetic transducer adjacent a selected track of a selected one of several magnetic recording media, the combination of a first means for positioning said transducer adjacent said selected medium, a second means for positioning said transducer adjacent said selected track on said selected medium, means for successively operating said first and second positioning means, means for damping said operating means, and means independently controlling the effectiveness of said damping means according to the positioning means being operated.

5. The invention set forth in the preceding claim with the further provision of means for independently controlling the effectiveness of said damping means according to the length and direction of movement of said positioning means.

6. A magnetic memory device comprising a plurality of magnetic discs mounted for rotation on a common shaft, a first member positionable axially of said discs, a second member carried by said first member and positionable transversely of said discs, a transducer carried by said second member for coacting with said discs for recording data thereon, means for selectively operating said first member to position said transducer at a selected disc and for selectively operating said second member to position said transducer at a selected recording path on said selected disc, and means for damping said operating means, said damping means being operable to independently affect said operating means according to which of said first or second members is being positioned thereby for independently anticipating the destination thereof, whereby the degree of anticipation corresponds to the member being positioned.

7. In a device for selectively positioning a magnetic transducer adjacent one of several tracks on one of several magnetic recording members, the combination of an arm for supporting said transducer, a carriage for supporting said arm, said carriage being movable relative to said recording members for positioning said arm adjacent a selected member and said arm being movable relative to said carriage for positioning said transducer adjacent a selected track of said selected member, means for moving said carriage and said arm, means for controlling said moving means to successively position said carriage and said arm, means for independently damping said moving means according to whether said carriage or said arm is being positioned thereby, and means for further damping said moving means according to the distance said carriage or said arm is being moved, said last mentioned means being additionally responsive to the direction of motion of said carriage or said arm.

8. A device for selectively positioning a magnetic transducer adjacent one of several magnetic recording tracks on one of several magnetic recording discs supported for rotation by a common shaft, comprising a first member positionable axially of said discs, a second member carried by said first member and positionable transversely of said discs, said magnetic transducer being carried by said second member for coacting with said discs, means for selectively operating said first member to position said transducer at a selected disc and for selectively operating said second member to position said transducer at a selected track on said selected disc, means for resisting the operation of either of said members until the other is positioned whereby said operating means is effective to position one of said members when the operation of the other is resisted, and means under the control of said resisting means for damping the effect of said operating means according to the member being positioned thereby.

9. The invention set forth in claim 8, wherein said operating means is responsive to independent signals representative of selected discs and selected tracks and said resisting means is operable to control the selection of said signals, whereby the selection of said signals and the effect of said damping means are under the control of said resisting means.

10. The invention set forth in claim 9 with the further provision of means for providing additional damping to said operating means according to the magnitude and polarity of each of said signals, said resisting means being arranged to control said additional damping means according to the member being positioned by said operating means.

11. An apparatus for positioning an element at selected locations relative to a reference axis comprising: a first member; means mounting said first member for movement parallel to said reference axis; a second member supporting said element, said second member being carried by said first member; means mounting said second member for movement along an axis transverse to said reference axis; common driving means arranged to selectively move said first and second members along their respective axes; control means for controlling said common drive means to position said element at a selected location; and means for modifying the operation of said control means in accordance with the member being moved, the direction of movement, and the distance to be moved.

References Cited in the file of this patent

UNITED STATES PATENTS

| | | |
|---|---|---|
| 2,450,907 | Newton et al. | Oct. 12, 1948 |
| 2,522,240 | Sias | Sept. 12, 1950 |
| 2,527,665 | Wild | Oct. 31, 1950 |
| 2,650,830 | Potter | Sept. 1, 1953 |
| 2,707,143 | Ingledue | Apr. 26, 1955 |